United States Patent [19]

Beaudoin

[11] Patent Number: 5,084,995
[45] Date of Patent: Feb. 4, 1992

[54] FISHING JIGGING APPARATUS

[76] Inventor: Arthur W. Beaudoin, 901 N. Jefferson St., Palmyra, Wis. 53156

[21] Appl. No.: 634,746

[22] Filed: Dec. 24, 1990

[51] Int. Cl.⁵ .............................................. A01K 89/00
[52] U.S. Cl. ...................................... 43/26.1; 43/19.2
[58] Field of Search .................. 43/19.2, 26.1, 21.2, 43/21, 15

[56] References Cited

U.S. PATENT DOCUMENTS

| | | | |
|---|---|---|---|
| 2,992,504 | 7/1961 | Cape | 43/19.2 |
| 3,031,790 | 5/1962 | Duryea | 43/19.2 |
| 3,292,906 | 12/1966 | Thordarson | 43/19.2 |
| 4,603,499 | 8/1986 | Simborski | 43/19.2 |

Primary Examiner—Richard K. Seidel
Assistant Examiner—Jeanne M. Elpel
Attorney, Agent, or Firm—Leon Gilden

[57] ABSTRACT

An apparatus including a support platform mounting a rear and forward support stand to orient a fishing pole defining an acute included angle between the fishing pole and the support platform. A fishing line extending from the fishing pole is reciprocated by use of a link mounting an outer terminal end of the fishing pole by a shock-absorbing spring connection. A drive motor effects rotation of a terminal drive gear, with the drive link mounted to the drive gear in an eccentric orientation.

5 Claims, 3 Drawing Sheets

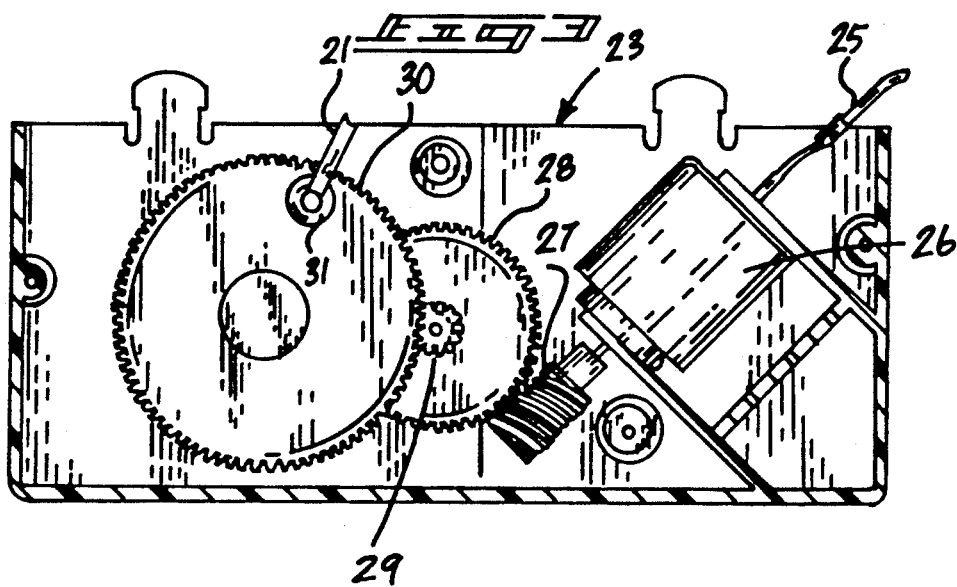
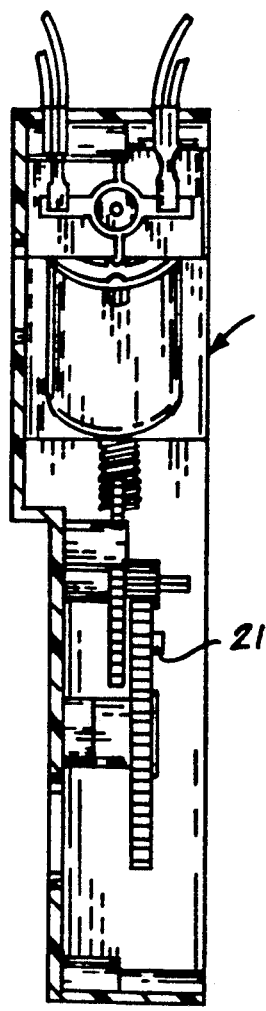

FISHING JIGGING APPARATUS

BACKGROUND OF THE INVENTION

1. Field of the Invention

The field of invention relates to fishing apparatus, and more particularly pertains to a new and improved fish jigging apparatus arranged to effect reciprocation of a fishing line within a fishing body of water.

2. Description of the Prior Art

Fishing apparatus of various types have been provided in the prior art to accommodate various fishing conditions. The instant invention addresses the convenient and effective solution of reciprocation of fishing line within a body of water to be fished to provide attraction to an associated fish. The apparatus may be utilized in a typical body of water to address the tedious jigging procedure in a typical fishing scenario. Examples of the prior art include U.S. Pat. No. 4,779,371 to Braud wherein an ice fishing device utilizes a jigging arrangement for fishing line, wherein the fishing pole is mounted directly to an eccentric and the fishing pole is pivoted to effect a jigging procedure.

U.S. Pat. No. 4,660,317 to Evans sets forth an apparatus for supporting and agitating a fishing rod, wherein a fishing pole is mounted to a support and wherein the support effects reciprocation of the fishing pole as it is mounted to a support.

U.S. Pat. No. 4,081,922 to Johnson sets forth a fishing pole jigging organization wherein an electric motor mounted to support racks reciprocate plates to effect jigging of the fishing line within fishing waters.

U.S. Pat. No. 4,603,499 to Simborski sets forth a holder and a cam drive to deflect a mounted fishing pole to effect a jigging procedure.

U.S. Pat. No. 4,597,215 to Otremba sets forth a rotatable holder for mounting a fishing pole, with a motor for driving a set of matched gears driving a cam to oscillate the holder and the associated fishing pole in a manner conventional in the prior art.

As such, it may be appreciated that there continues to be a need for a new and improved fish jigging apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fish jigging apparatus now present in the prior art, the present invention provides a fish jigging apparatus wherein the same utilizes a stationarily mounted fishing pole utilizing a cam drive to deflect an outer tip of the pole and further including a shock absorbing spring member mounted between the cam drive and the pole. As such, the general purpose of the present invention, which will be described subsequently in greater detail, is to provide a new and improved fish jigging apparatus which has all the advantages of the prior art fish jigging apparatus and none of the disadvantages.

To attain this, the present invention provides an apparatus including a support platform mounting a rear and forward support stand to orient a fishing pole defining an acute including angle between the fishing pole and the support platform. A fishing line extending from the fishing pole is reciprocated by use of a link mounting an outer terminal end of the fishing pole by a shock-absorbing spring connection. A drive motor effects rotation of a terminal drive gear, with the drive link mounted to the drive gear in an eccentric orientation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish jigging apparatus which has all the advantages of the prior art fish jigging apparatus and none of the disadvantages.

It is another object of the present invention to provide a new and improved fish jigging apparatus which may be easily and efficiently manufactured and marketed.

It is a further object of the present invention to provide a new and improved fish jigging apparatus which is of a durable and reliable construction.

An even further object of the present invention is to provide a new and improved fish jigging apparatus which is susceptible of a low cost of manufacture with regard to both materials and labor, and which accordingly is then susceptible of low prices of sale to the consuming public, thereby making such fish jigging apparatus economically available to the buying public.

Still yet another object of the present invention is to provide a new and improved fish jigging apparatus which provides in the apparatuses and methods of the prior art some of the advantage thereof, while simultaneously overcoming some of the disadvantages normally associated therewith.

Still another object of the present invention is to provide a new and improved fish jigging apparatus wherein the same oscillates an outermost tip of a fishing pole utilizing a shock-absorbing connector member minimizing breakage to the pole and associated fishing line during the advent of a fish strike.

These together with other objects of the invention, along with the various features of novelty which characterize the invention, are pointed out with particularity in the claims annexed to and forming a part of this disclosure. For a better understanding of the invention, it operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic cross-sectional illustration of the drive motor and housing utilized by the instant invention.

FIG. 4 is an orthographic top view of the drive motor and housing as set forth in FIG. 3.

DESCRIPTION OF THE PREFERRED EMBODIMENT

Figure 1:
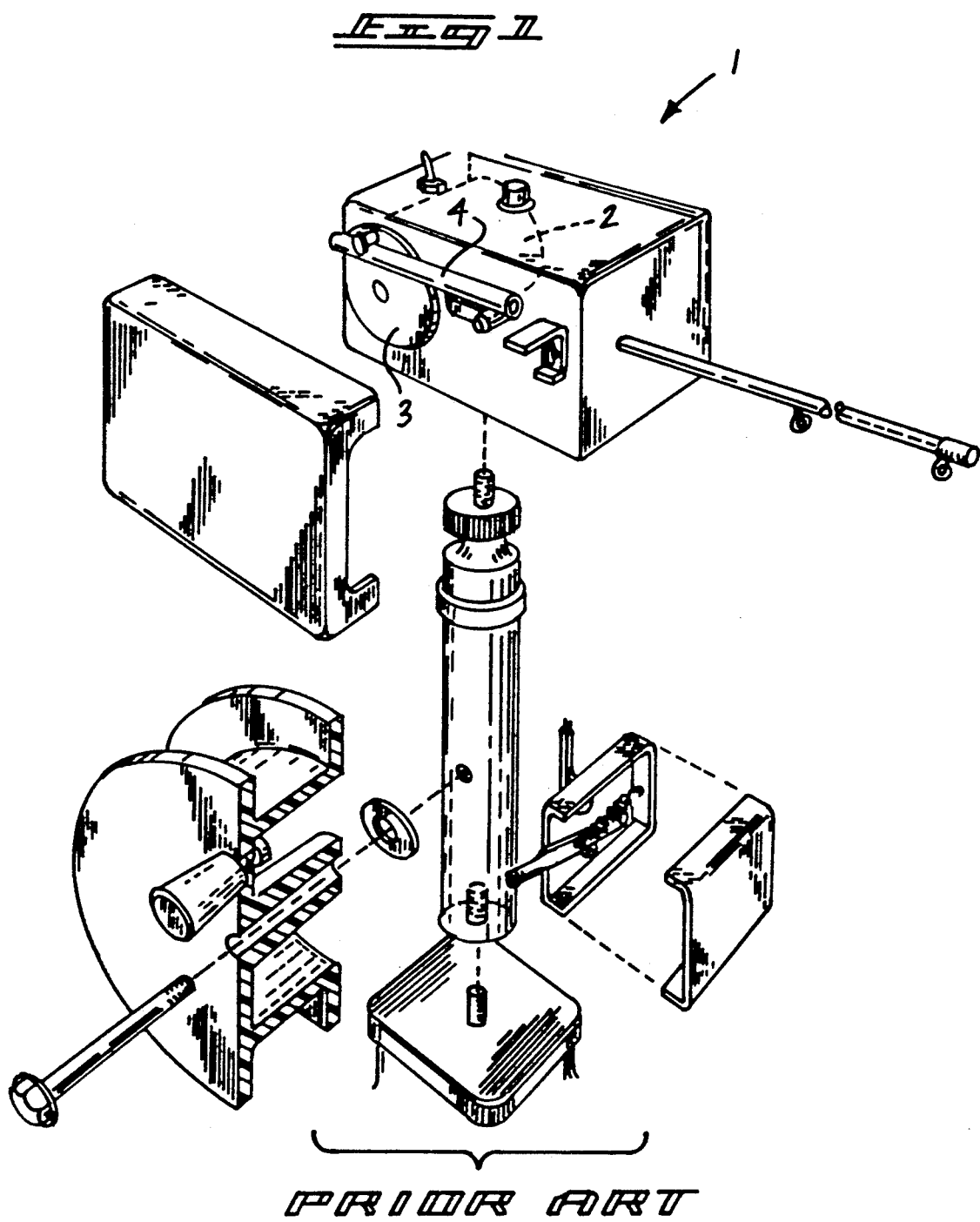
FIG. 1 is an isometric illustration of a prior art fish jigging apparatus
Figure 2:
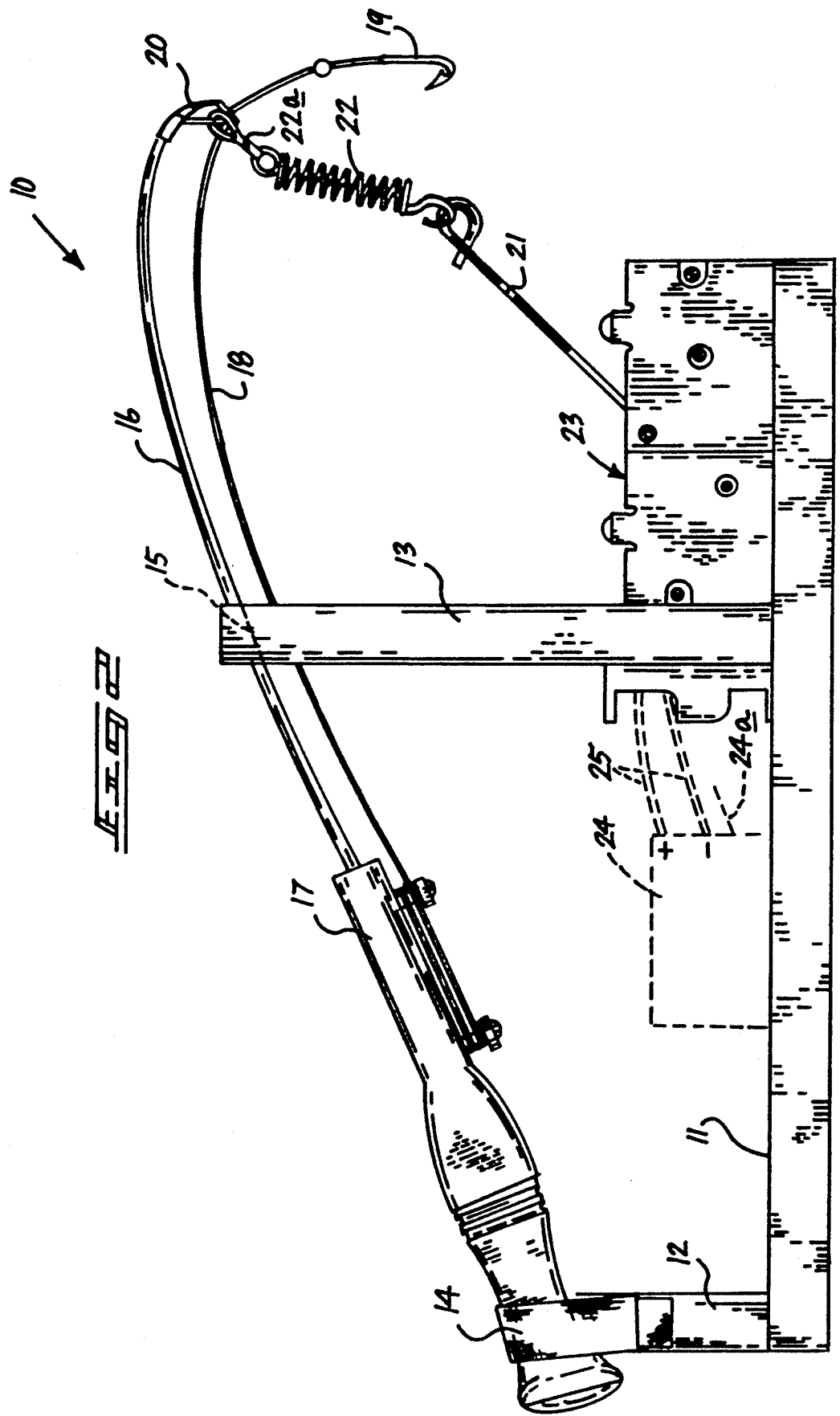
FIG. 2 is an orthographic side view, taken in elevation, of the instant invention.

With reference now to the drawings, and in particular to FIGS. 1 to 4 thereof, a new and improved fish jigging apparatus embodying the principles and concepts of the present invention and generally designated by the reference numeral 10 will be described.

FIG. 1 illustrates a prior art fish jigging apparatus 1, wherein a housing includes a drive motor 2 mounted therewithin, wherein a crank wheel 3 mounts a fishing pole 4 and effects angulation of a fishing pole and an associated jigging action therewith, as set forth in U.S. Pat. No. 4,779,371.

More specifically, the fish jigging apparatus 10 of the instant invention essentially comprises a planar support base 11, with the support base 11 including a rear support 12 defined by a first height, and a forward support 13 of a second height greater than the first height. The rear support includes a hook and loop fastener belt 14 securable about a fishing pole handle 17 to secure the fishing pole handle in contiguous association with an upper terminal end of the rear support 12. The forward support 13 includes an angulated recess 15 to receive the fishing pole 16 therewithin medially of the handle and an outer terminal end of the fishing pole that has fixedly secured thereto an outer eyelet 20 mounted to the outer terminal end. Fishing line 18 is directed from the handle through the outer eyelet 20, with a hook 19 mounted to the free end of the fishing line 18. A reciprocating rod 21 is rotatably mounted at its lower terminal end to a drive lug 31 of an associated second driven gear 30 (to be described in more detail below) and pivotally mounted at its upper terminal end to a shock-absorbing coil spring 22. An upper terminal end of the coil spring 22 mounts a loop member 22a to cure the upper terminal end of the coil spring 22 to the outer eyelet 20 permitting angular displacement of the coil spring 22 relative to the outer eyelet 20.

A drive housing 23 is spaced adjacent a conventional battery 24 to be utilized, with electrical connecting wires 25 directed from the battery 24 to an electric drive motor 26 contained within the drive housing 23. A switch 24a is conveniently provided, as required, to effect selective directing of electrical current to the drive motor 26 in a direct current relationship. The electric drive motor 26 includes an output worm gear 27 defined by a first diameter driving a first driven gear 28 of a second diameter greater than the first diameter. An output drive gear 29 coaxially mounted relative to the first driven gear 28 is defined by a third diameter less than the first diameter and drives the second driven gear 30 of a fourth diameter greater than the first, second, and third diameters. The gearing permits driving of increased torque and reduced speed in reciprocation of the outer terminal end of the fishing pole in a jigging procedure. The spring 22 minimizes shock during a fish strike minimizing breakage of fishing line and equipment.

As to the manner of usage and operation of the instant invention, the same should be apparent from the above disclosure, and accordingly no further discussion relative to the manner of usage and operation of the instant invention shall be provided.

With respect to the above description them, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish jigging apparatus comprising, in combination,
   an elongate planar support base, the support base including a rear support fixedly and orthogonally mounted to a top surface of the support base, and
   a forward support spaced from and parallel to the rear support integrally and orthogonally mounted to the top surface of the support base, and
   a fishing pole organization including a fishing pole handle and a fishing pole body member, with the fishing pole handle mounted to an upper terminal end of the rear support and the fishing pole body member mounted to an upper terminal end of the forward support, and
   an outer eyelet mounted to an outer terminal end of the fishing pole body member remote from the fishing pole handle, and
   fishing line directed from the fishing pole handle through the outer eyelet, and
   a fishing hook mounted to a free terminal end of the fishing pole line arranged for reciprocation, and
   a drive housing mounted to the top surface of the support base, the drive housing including a drive motor, and
   the drive motor including an output worm gear, the output worm gear operatively associated with a first driven gear, the first driven gear operatively associated with an output drive gear, the output drive gear operatively associated with a second driven gear, and the second driven gear including reciprocating rod means, the reciprocating rod means mounted to the second driven gear and through the outer eyelet to effect reciprocation of the outer eyelet.

2. An apparatus as set forth in claim 1 wherein the output worm gear is defined by a first diameter, the first driven gear is defined by a second diameter greater than the first diameter, the output drive gear is defined by a third diameter less than the first diameter, and the second driven gear is defined by a fourth diameter greater than the first diameter, second diameter, and third diameter, and the first driven gear is coaxially and rotatably mounted to the drive housing, and the second driven gear is coaxially and rotatably mounted to the drive housing, and the output drive gear is coaxially mounted to the first driven gear, and a drive lug eccentrically mounted relative to the driven gear, the drive lug mounting the reciprocating rod means thereto.

3. An apparatus as set forth in claim 2 wherein the reciprocating rod means includes a reciprocating rod rotatably mounted to the drive lug at a lower terminal end of the reciprocating rod, and a shock-absorbing coil spring mounted pivotally to an upper terminal end of the reciprocating rod means, and a loop member mounted to an upper terminal end of the coil spring, and the loop member pivotally mounted to the outer eyelet.

4. An apparatus as set forth in claim 3 wherein the rear support is defined by a first height, and the forward support is defined by a second height, the second height greater than the first height to orient the fishing pole body member at an acute included angle between the support base and the fishing pole body member.

5. An apparatus as set forth in claim 4 including a battery mounted to the top surface support base adjacent the drive housing, and electrical connecting wires in operative association between the battery and the drive motor.

* * * * *